United States Patent Office 3,312,606
Patented Apr. 4, 1967

3,312,606
PROCESS FOR THE PRODUCTION OF ORGANIC PHOSPHINE HALIDES
Reinhard Schliebs, Cologne-Stammheim, Germany, assignor to Farbenfabriken Bayer Aktiengesellschaft, Leverkusen, Germany, a corporation of Germany
No Drawing. Filed Sept. 17, 1963, Ser. No. 309,386
Claims priority, application Germany, Oct. 17, 1962, F 38,062
7 Claims. (Cl. 204—62)

The invention relates to a process for the production of organic phosphine halides by electrolysis of complexes of organic phosphorus halides and aluminum halides.

It is known from the Journal of the Chemical Society, 1952, pages 3437–3445 that complexes of the general formula $[RPCl_3]^+[AlCl_4]^-$, in which R=alkyl, conduct electricity in solution in methylene chloride. If these complexes are decomposed electrolytically, the following cathode and anode reactions are to be expected:

Cathode: $2RPCl_3^+ + 2e^- \rightarrow 2RPCl_3 \rightarrow RPCl_2 + RPCl_4$
Anode: $2AlCl_4^- - 2e^- \rightarrow 2AlCl_3 + 2Cl \rightarrow 2AlCl_3 + Cl_2$ With the passage of direct current, aluminum chloride is actually deposited on the anode. However, no products can be isolated at the cathode. Especially, no chlorine is developed.

If liquid complexes of the general formula $$[RPCl_3]^+[Al_2Cl_7]^-$$

are used instead of a complex of the formula $$[RPCl_3]^+[AlCl_4]^-$$

dissolved in methylene chloride, it is also possible to conduct considerable direct currents through these complexes also without the liberation of chlorine at the anode.

A process for the production of organic phosphine halides from organic phosphorus halide-aluminum halide complexes has now been found in which a phosphorus halide-aluminum halide complex of the formula $$[RXPHal_2]^+[Al_nHal_y]^-$$

in which R represents a straight-chain or branched alkyl radical or a cycloalkyl radical, X=chlorine, bromine, R or an aryl radical, Hal=chlorine or bromine, $n=1$ or 2 and $y=4$ or 7, is electrolyzed in an electrolysis cell with cathode, anode and a diaphragm, as catholyte as such or in a solvent, an anhydrous melt or solution of ion-conducting inorganic compounds being used as anolyte and the organic phosphine halide which is formed being isolated from the melt or solution. The electrolysis is carried out at temperatures above the melting point of the material in question. Depending on this material temperatures of 60 to 250° C. are used.

It is advantageous to use melts of alkali metal-tetrahalogen-aluminates, although in principle it is also possible to employ other ion-conducting compounds, such as for example a melt of 2 mols. of sodium chloride and 1 mol. of ferric chloride or a solution of aluminum chloride in excess thionyl chloride. Among the complexes to be electrolyzed, there are for example to be mentioned the following: ethyl tetrachlorophosphine-aluminum chloride complex, ethyl tetrachlorophosphine-bis-aluminum chloride complex, diethyl trichlorophosphine-aluminum chloride complex and the corresponding bromine-containing complexes, e.g. $[RPBr_3]^+[Al_2Br_7]^-$. It is also possible to produce phenyl-methyl chlorophosphine by the electrolytic reduction of the complex of the formula $$[(C_6H_5)(CH_3)PCl_2]^+[AlCl_4]^-$$

Very suitable for this purpose are the complexes such as are produced by an earlier proposal of ours by reacting a phosphorus halide with an alkyl or cycloalkyl chloride in a solution of aluminum chloride in alkali metal tetrachloraluminates, at or above the melting temperature of these solutions.

The organophosphorus halide-aluminum chloride complex is in the cathode space, either in pure form or in a suitable solvent. Particularly suitable as solvents are the said alkali metal aluminum halides, but organic solvents such as methylene chloride or benzonitrile may also be used.

The nature of the electrolysis cell is of no decisive importance for carrying out the electrolysis. It is possible to use either V-shaped, U-shaped or H-shaped cells, in which the anode and cathode spaces are separated for example by a diaphragm consisting of fritted glass, glass fiber cloth or asbestos board. On the other hand, it is also possible to use trough-shaped cells in which clay crucibles serve as diaphragms. The diaphragms should be so dense that there is no substantial non-electrolytic exchange of material between the two spaces. The choice of the cathode material is of no great importance and iron, stainless steels or nickel are suitable for the purpose. When using alkali metal tetrachloraluminate melts as anolyte, the choice of anode materials is, on the other hand, very limited. Whereas nickel or carbon in the form of charcoal or graphite can be used for a short time, only tungsten and silicon carbide can be employed for relatively long experiments.

The organic phosphine halides produced by the process can for example be used for the production of insecticides.

EXAMPLE 1

Into a stainless steel vessel equipped with a gas discharge pipe, a cooling jacket and a heating means, there was introduced a solution of 445 g. of $$[C_2H_5PCl_3]^+[AlCl_4]^-$$

in 1555 g. of sodium tetrachloraluminate, which solution was produced by reacting phosphorus trichloride and ethyl chloride in a melt of aluminum chloride and sodium tetrachloraluminate, and a clay cell was suspended in this melt. The clay cell itself contained 965 g. of sodium tetrachloraluminate. It was closed by a rubber plug having several drilled holes (gas discharge pipe, two tungsten anodes, thermometer). The clay cell and stainless steel vessel were sealed off from one another by a rubber ring. The vessel was externally heated to 160° C., the vessel was connected as the cathode and the tungsten electrode as the anode and the external heating again switched off. With a voltage of 7–9 volts, a current of 16 amps flowed and the temperature was kept by external cooling at 160–175°. From the anode chamber, there was immediate vigorous evolution of chlorine. From the cathode chamber, ethyl dichlorophosphine distilled off after about 40 minutes. The experiment was stopped after the system had received 71.3 Ah. 67 g. of chlorine were formed and the current yield was 80.5%. During the experiment, 55 g. of ethyl dichlorophosphine were distilled off, and another 48 g. of ethyl dichlorophosphine were obtained by heating the cathode liquid in vacuo (12 mm. Hg) to 200°, that is, a total of 103 g. This corresponds to a current yield of 59.3%. 260 g. of aluminum chloride were recovered from the anode space by heating in vacuo.

EXAMPLE 2

Instead of starting from the ethyl tetrachlorophosphine-aluminum chloride complex, it is also possible to employ the ethyl tetrachlorophosphine-bis-aluminum chloride complex.

In an electrolysis cell according to Example 1, a mixture of 551 g. of $[C_2H_5PCl_3]^+[Al_2Cl_7]^-$ and 1072 g. of sodium tetrachloraluminate was introduced into the cathode space and 990 g. of sodium tetrachloraluminate into the anode space. Electrolysis was carried out under similar conditions to those of Example 1 and the experiment stopped after the system had received 58.5 Ah. During the experiment, no ethyl dichlorophosphine was distilled.

Chlorine yield: 77 g., theoretical.
Aluminum chloride from the anode space: 218 g.
Ethyl dichlorophosphine by vacuum distillation of the cathode space:
 (a) Without addition of common salt: 27.3 g.
 (b) With addition of common salt: 70.2 g.=97.5 g., 68.2% current yield.

EXAMPLE 3

For reasons of the electrical conductivity, it is certainly desirable that the complex to be reduced should be diluted with alkali metal tetrachloraluminate, but this is not absolutely necessary: a U-shaped cell, in which the cathode and anode spaces were separated by an inwardly flanged glass fiber diaphragm, contained a nickel tube as cathode and a bundle of 6 tungsten welding electrodes as anode. 267 g. of $[C_2H_5PCl_3]^+[Al_2Cl_7]^-$, were placed in the cathode space and 265 g. of sodium-lithium tetrachloraluminate (which starts to solidify at about 110°) were placed in the anode space. Electrolysis was carried out at 150° C. and 0.5–0.6 amps until 840.80 Ah were absorbed. Yield: 21 g. of chlorine, 68% current yield and 22 g. of ethyl dichlorophosphine, 38.6% current yield.

It was hitherto not known in the literature, even if obvious, that it is also possible to produce complexes of the formula $[RPBr_3]^+[Al_2Br_7]^-$ (R=alkyl), to reduce them with aluminum and to produce alkyl dibromophosphines from the reduced complexes with addition of sodium bromide:

533 g. of aluminum bromide (2 mols) and 271 g. of phosphorus tribromide (1 mol) were introduced into a stirrer-type vessel equipped with a Dry Ice reflux condenser, a thermometer and a dropping funnel which can be cooled, and 95 g. of methyl bromide were added dropwise from the dropping funnel. In an exothermic reaction, the complex $[CH_3PBr_3]^+[Al_2Br_7]^-$ is formed, this solidifying at 65–70°. The complex thus formed was reduced at about 200° with 18 g. of aluminum. After mixing in 310 g. of sodium bromide, there were obtained 152 g. (74% of the theoretical) of methyl dibromophosphine of the boiling point 140° by vacuum distillation.

EXAMPLE 4

The electrolytic reduction of the complex

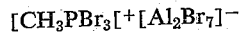

was carried out in an electrolysis cell according to Example 3. 285 g. of the complex were introduced into the cathode space and 285 g. of sodium-lithium tetrachloraluminate into the anode space. Electrolysis was carried out at 155° and with 0.4–0.6 amps. There was no danger of the cathodically formed methyl dibromophosphine attacking the nickel cathode with formation of the complex $[Ni(CH_3PBr_2)_4]$, since this complex is not stable above 110° (see L. Maier, Angew. Chem., 71, 574, 1959). The experiment was stopped after the system had received 12.9 Ah. The contents of the cathode space were distilled with addition of 35 g. of sodium bromide at 12 mm. Hg and there were obtained 30 g. of methyl dibromophosphine, corresponding to a current yield of 60.6%. From the anode space, a mixture of 21.6 mol percent of bromine with 78.4 mol percent of chlorine were liberated during the electrolysis. Subsequent to the experiment, it was possible to obtain 61 g. of a mixture of 77.3 mol percent of aluminum chloride and 22.7 mol percent of aluminum bromide from the anode liquid in vacuo.

EXAMPLE 5

Using a V-shaped cell, in which the anode and cathode spaces were separated by a glass frit diaphragm and which had a nickel cathode and a tungsten anode, 195 g. of sodium tetrachloraluminate were introduced into the anode chamber and 195 g. of a mixture of

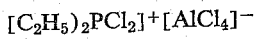

and sodium tetrachloraluminate (molar ratio 1:1) were introduced into the cathode space. The catholyte was prepared by reacting ethyl dichlorophosphine with ethyl chloride in a melt of aluminum chloride in sodium tetrachloraluminate and started to solidify from 67°. Electrolysis was carried out at 170° and with 1.3–1.9 amps until the system had received 32,600 Ah. 11 g. of chlorine were developed and the current yield was 92%. The contents of the cathode base were distilled with 50 g. of potassium chloride and a distillate was obtained which contained 5.4 g. of ethyl dichlorophosphine, B.P.$_{140}$ 82° C. This corresponds to a current yield of 25.4%.

It is known that complexes of the general formula $[ArRPCl_2]^+[AlCl_4]^-$ can be produced from aryl dichlorophosphines, alkyl chlorides and aluminum chloride. It has not so far become known, even although obvious, that complexes of this type can be reduced with aluminum to the corresponding aryl-alkyl chlorophosphine. For example, by reaction of the complex

with aluminum and excess potassium chloride in vacuum, phenylmethyl chlorophosphine, B.P.$_{13}$ 92° C. is obtained in a yield of about 50%. In the same manner as described with the production of the diethyl chlorophosphine, phenylmethyl chlorophosphine was obtained with a yield of 55.0%.

EXAMPLE 6

Using an H-shaped cell, in which both vertical tubes can be heated independently of one another, and which has a nickel cathode and a tungsten anode, 330 g. of sodium-lithium tetrachloraluminate were introduced into the anode space and 250 g. of a mixture of 2 mols of sodium tetrachloraluminate with 1 mol of cyclohexyl tetrachlorophosphine-aluminum chloride complex were introduced into the cathode space. The catholyte had been prepared by reacting phosphorus trichloride and cyclohexyl chloride with a solution of aluminum chloride in sodium tetrachloraluminate. A G 3 frit was situated in the horizontal part of the cell. The anode space was heated to 160–170° and the cathode space to 60–64°. Electrolysis was carried out with about 0.135 amp until the system had received about 9 Ah. The content of the cathode space was thereafter distilled with 60 g. of potassium chloride, 12 g. of crude cyclohexyl dichlorophosphine being obtained.

By distillation, 9 g. of the pure compound were recovered (B.P.$_3$ 55° chlorine=38.6%). This corresponds to a current yield of 29%.

The low yields in some of the examples are to be attributed to the fact that in this case small cells were used, in which stirring could not be carried out. As a result, there was over-reduction at the cathode (deposition of organically substituted metal phosphides etc.), which naturally reduce the yield.

EXAMPLE 7

1570 g. of a melt consisting of equal parts of the complexes $[CH_3PCl_3]^+[AlCl_4]^-$ and $[CH_3PCl_3]^+[Al_2Cl_7]^-$ were electrolysed with vigorous stirring in a glass cell, which was fitted with stirrers for the cathode and the anode space.

387 g. of methyldichlorophosphine was obtained for 205 Ah which went into the system and 265 g. of chlorine was evolved. This corresponds to a current yield of 86.5%.

What is claimed is:
1. Process for producing organic phosphine halides which comprises electrolyzing as a catholyte in an elec- trolysis cell having a diaphragm, a phosphorus halide-aluminum halide complex of the general formula $$[RXPHal_2]^+[Al_nHal_y]^-$$

wherein R is a member of the group consisting of alkyl radicals and cycloalkyl radicals, X is a member of the group consisting of chlorine, bromine, an alkyl radical, a cycloalkyl radical and an aryl radical, Hal is a member of the group consisting of chlorine and bromine, $n$ represents an integer selected from 1 and 2, wherein when $n$ is 1, $y$ is 4 and when $n$ is 2, $y$ is 7, and electrolyzing as an anolyte an anhydrous melt of ion-conducting inorganic compounds selected from the group consisting of alkali-tetrahalogen aluminates and mixtures of sodium chloride and ferric chloride, said electrolyzing being effected in the molten state at a temperature of 60 to 250° C. and recovering the organic phosphine halide formed.

2. Process for producing organic phosphine halides which comprises electrolyzing as a catholyte in an electrolysis cell having a diaphragm, a phosphorus halide-aluminum halide complex of the general formula $$[RXPHal_2]^+[Al_nHal_y]^-$$

wherein R is a member of the group consisting of alkyl radicals and cycloalkyl radicals, X is a member of the group consisting of chlorine, bromine, an alkyl radical, a cycloalkyl radical and an aryl radical, Hal is a member of the group consisting of chlorine and bromine, $n$ represents an integer selected from 1 and 2, wherein when $n$ is 1, $y$ is 4 and when $n$ is 2, $y$ is 7, and electrolyzing as an anolyte an anhydrous solution of ion-conducting inorganic compounds, said electrolyzing being effected in a solvent at a temperature of 60 to 250° C. and recovering the organic phosphine halide formed.

3. Process according to claim 2, wherein said solvent is an alkali aluminum halide.

4. Process according to claim 2, wherein said solvent is methylene chloride.

5. Process according to claim 2, wherein said solvent is benzonitrile.

6. Process for producing ethyl dichlorophosphine which comprises electrolyzing as a catholyte in an electrolysis cell having a diaphragm, a complex of the formula $$[C_2H_5PCl_3]^+[Al_2Cl_7]^-$$

solved in molten sodium tetrachloro-aluminate and electrolysing as an anolyte a melt of sodium tetrachloro-aluminate at a temperature of 160 to 175° C. and recovering the ethyl dichlorophosphine formed.

7. Process for producing methyldibromophosphine which comprises electrolyzing as a catholyte in an electrolysis cell having a diaphragm a complex of the formula $$[CH_3PBr_3]^+[Al_2Cl_7]^-$$

solved in molten sodium-lithium tetrachloro-aluminate and electrolysing as an anolyte a melt of sodium-lithium tetrachloro-aluminate at a temperature of 160 to 175° C. and recovering the ethyl dichlorophosphine formed.

No references cited.

JOHN H. MACK, *Primary Examiner.*

G. KAPLAN, *Assistant Examiner.*